United States Patent
Pulugurta et al.

(10) Patent No.: US 8,818,430 B1
(45) Date of Patent: Aug. 26, 2014

(54) MANAGEMENT OF MESSAGE TRANSMISSION IN A WIRELESS COMMUNICATION DEVICE

(75) Inventors: Srikanth Pulugurta, Overland Park, KS (US); Maulik K. Shah, Overland Park, KS (US); Siddharth S. Oroskar, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 782 days.

(21) Appl. No.: 12/882,837

(22) Filed: Sep. 15, 2010

(51) Int. Cl.
*H04W 72/00* (2009.01)

(52) U.S. Cl.
USPC .......................................... 455/464; 370/338

(58) Field of Classification Search
CPC .. H04W 72/00; H04W 72/02; H04W 72/1231
USPC .................................... 455/450, 466; 370/338
See application file for complete search history.

(56) References Cited

U.S. PATENT DOCUMENTS

| | | | |
|---|---|---|---|
| 5,361,401 A | 11/1994 | Pirillo | |
| 5,822,700 A * | 10/1998 | Hult et al. | 455/466 |
| 6,097,961 A | 8/2000 | Alanara et al. | |
| 6,333,937 B1 * | 12/2001 | Ryan | 370/468 |

* cited by examiner

*Primary Examiner* — Marcos Batista

(57) ABSTRACT

Disclosed is a method and apparatus for managing transmission of messages such as SMS messages. A device will determine based on access probe count history whether to transmit a message on a reverse access channel or on a reverse traffic channel, and the device will transmit the message accordingly.

22 Claims, 3 Drawing Sheets

US 8,818,430 B1

MANAGEMENT OF MESSAGE TRANSMISSION IN A WIRELESS COMMUNICATION DEVICE

BACKGROUND

Cellular wireless communication devices, such as a mobile phones, personal digital assistants, and other wirelessly equipped devices, have become increasingly common in recent years. In general, a cellular wireless device communicates over an air interface with a base station, which provides the device with access to network resources, such as communication channels through which to interact with other devices or with network servers.

One of the more popular services for cellular wireless devices today is short message service (SMS) messaging, which entails communication of short alphanumeric messages or other binary data to or from a cellular wireless device. In practice, an SMS-equipped device may receive user input of a message and a message destination and may then send the message over the air interface to a base station for transmission in turn to the indicated destination. At the destination, the message can then be readily presented to a user or otherwise processed. In this manner, SMS messaging allows users to conveniently engage in quick back and forth communication with each other from virtually anywhere within cellular coverage. Further, SMS messaging can be used for assorted other purposes, such as delivery of news and advertisements, delivery of alerts, initiation of cellular data sessions, and conducting of group chat sessions, among numerous others.

In general, the air interface between a cellular wireless device and a serving base station may define various communication channels through which the device and base station can communicate with each other. "Forward" channels that carry communications from the base station to the device may include forward control channels such as paging channels for carrying page messages and forward traffic channels for carrying voice and other bearer data. "Reverse" Channels that carry communications from the device to the base station, on the other hand, may include reverse control channels such as access channels for carrying call origination requests and registration requests, as well as reverse traffic channels for carrying voice and other bearer data.

Under existing procedures, a cellular wireless device can transmit an SMS message to a base station over either a reverse access channel (R-ACH) or a reverse traffic channel (R-TCH).

On a reverse access channel, the device may transmit the SMS message in an "access probe" message in much the same way that the device would normally transmit a call origination request or registration request to the base station. Upon receipt of the SMS message, the base station or other serving equipment may then forward the SMS message to an SMS center (SMSC) for transmission in turn to a specified destination.

For reverse traffic channel transmission, on the other hand, if the device does not currently have an assigned traffic channel over which to communicate, the device may first transmit on a reverse access channel an origination message that seeks assignment of a traffic channel, and the device may then receive a traffic channel assignment from its serving base station. At that point, the device may then send the SMS message to the base station as bearer data over the assigned traffic channel, and the base station or other serving equipment may then forward the SMS message to an SMSC for transmission in turn to the specified destination.

OVERVIEW

When a cellular wireless device has an SMS message to transmit, the device may thus have a choice of whether to transmit the message on a reverse access channel or on a reverse traffic channel.

One basis for deciding which of these channels to use for the transmission may be the size of the message. In particular, to avoid overloading the reverse access channel (and particularly to conserve space on the reverse access channel for call origination messages and registration messages), a system may limit SMS messages on a reverse access channel to be no larger than a particular size, such as 140 bytes (e.g., 160 characters with 7-bit encoding). Faced with this limitation, the device may thus send the SMS message on a reverse access channel if the message is no larger than 140 bytes and the device may otherwise send the message on a reverse traffic channel. On the other hand, if the message to be sent is no larger than 140 bytes, then the message could be sent on either a reverse access channel or a reverse traffic channel, and so the device may still have a choice of which channel to use.

Disclosed herein is another basis to make this decision. As presently contemplated, a cellular wireless device will use a history of its access probe transmissions as a basis to decide whether to send an SMS message on a reverse access channel or on a reverse traffic channel. In particular, the device will maintain a record of how many access probes it has taken the device to engage in each of various access attempts, and the device will establish a representative measure, such as an average, of those access probe counts. As a basis to decide whether to transmit an SMS message on a reverse access channel or on a reverse traffic channel, the device will then determine whether the measure meets a defined threshold (e.g., whether the measure is as least as high as the threshold). If the device determines that the measure of access probe counts meets the threshold, then the device will decide to transmit the SMS message on a reverse traffic channel. Otherwise, the device will decide to transmit the SMS message on a reverse access channel.

These as well as other aspects, advantages, and alternatives will become readily apparent to those of ordinary skill in the art by reading the following detailed description with reference where appropriate to the accompanying drawings. Further, it should be understood that the description provided below and in this overview is intended to explain the invention by way of example only and not by way of limitation.

DETAILED DESCRIPTION

Figure 1:
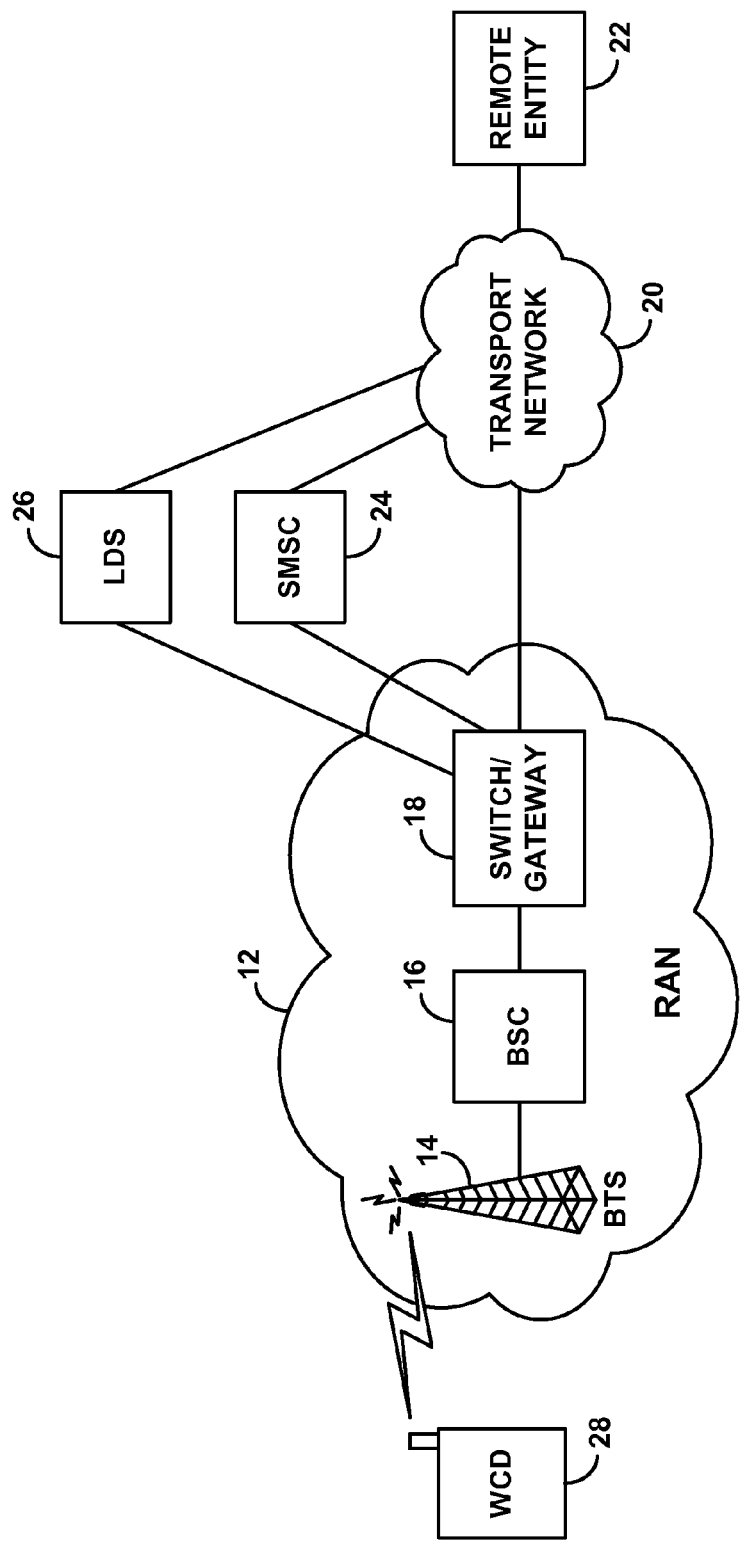
FIG. 1 is a simplified block diagram of a network in which an exemplary method and apparatus can be implemented.

Referring to the drawings, as noted above, FIG. 1 is a simplified block diagram of a network in which an exemplary method and apparatus can be implemented. As shown, the network includes at its core a radio access network (RAN) 12 that is arranged to serve wireless communication devices with cellular wireless communication service and to provide the devices with connectivity to one or more transport networks such as the public switched telephone network (PSTN) or the Internet for instance.

An exemplary RAN can take various forms, not limited to the specifics shown in the figure. In a rudimentary arrangement, for instance, the RAN can consist of a simple base station or access point that provides wireless service on one side and connects with a transport network on the other side. In a more typical arrangement, as shown, the RAN may include a base transceiver station (BTS) 14, a base station controller (BSC) 16, and a switch and/or gateway 18 such as a mobile switching center (MSC) or packet data serving node (PDSN), or by other such components.

BTS 14 may comprise an antenna arrangement and associated equipment arranged to radiate so as to define one or more wireless coverage areas (e.g., cells and cell sectors) in which the BTS can communicate with served devices according to an agreed air interface protocol, such as CDMA (e.g., 1xRTT, 1xEV-DO), iDEN, WiMAX (e.g., IEEE 802.16), LTE, TDMA, AMPS, GSM, GPRS, UMTS, EDGE, Wi-Fi (e.g., IEEE 802.11), or another protocol now known or later developed. Although just one BTS is shown in the figure, an exemplary RAN may include multiple BTSs arranged to provide coverage throughout a market area.

BSC 16 may manage BTS 14 (or more typically multiple BTSs) and control various aspects of air interface communication, such as assignment of traffic channels and handoff of wireless communication devices between various coverage areas. In some implementations, the functions of BSC 16 may instead be implemented by a radio network controller (RNC). Further, although the figure depicts BSC 16 separate from BTS 14, the two entities may be integrated together. In addition, although the figure depicts just one BSC, an exemplary RAN may include multiple BSCs each controlling a respective group of BTSs throughout a market area.

Switch or gateway 18, in turn, may control various aspects of the RAN and may provide connectivity with one or more transport networks, which the figure depicts generally as a representative transport network 20 coupled with a representative remote entity 22. By way of example, an MSC (or in more advanced implementations a soft-switch) may provide connectivity with the public switched telephone network (PSTN) so as to enable served devices to engage in telephone calls on the PSTN. And a PDSN may provide connectivity with a packet switched network such as the Internet or a wireless carrier's private packet network so as to enable served devices to engage in packet-data communication (e.g., web browsing, streaming media sessions, push-to-talk sessions, etc.). Although the figure depicts switch or gateway 18 separate from BTS 14 and BSC 16, in some implementations the switch or gateway could be integrated together with either or both of these entities.

In an exemplary arrangement as shown, switch or gateway 18 may also be in communication (e.g., through a signaling network or other connection) with an SMS center (SMSC) 24. Generally, SMSC 24 functions to store and forward SMS messages. In practice, for instance, when SMSC 24 receives an SMS message destined to a particular WCD, the SMSC may determine which switch is serving the WCD and may then forward the SMS message to that switch for transmission in turn to the WCD. Likewise, when the SMSC receives from a WCD an SMS message that is destined to a specified recipient address (e.g., a phone number of some other WCD, or an e-mail address or other recipient address), the SMSC may then transmit the SMS message to the specified address. Although not shown, a gateway may be included in the SMSC or otherwise provided to facilitate translation between SMS messages and e-mail messages, so as to enable WCDs to engage in e-mail communication via SMS.

Further, switch or gateway 18 may be in communication with a location-determination system 26. Generally, location-determination system 26 may facilitate determining the location of WCDs served by the RAN. For instance, the location-determination system 26 could receive base station signal measurements taken by the WCD at issue and, considering known locations of the base stations, could use the measurements to approximate the location of the WCD. Further, the location-determination system could provide the WCD with information about satellites in the sky over the approximated location, the WCD could tune into the indicated satellites and provide the location-determination system with satellite signal measurements, and the location-determination system could then use those measurements to more accurately determine the location of the WCD.

Shown served by the example RAN is a representative wireless communication device (WCD) 28, which may be a cell phone, personal digital assistant, or other mobile or stationary device equipped to engage in cellular wireless communication and to be served by RAN 12 according to the agreed air interface protocol. Although this document may describe specific functions of WCD 28 such as voice call origination or the like, it will be understood that the WCD could largely be any wirelessly equipped device that is arranged to implement the present method, regardless of whether the device is also arranged to carry out one or more other mentioned functions.

As noted above, the air interface between the RAN and a served device may define various forward link channels and various reverse link channels. The particular channels may be protocol dependent and may be defined in various ways, such as through frequency division multiplexing, time division multiplexing, and code division multiplexing for instance.

By way of example, under traditional CDMA systems, each coverage area operates on a pair of carrier frequencies (one for forward link communications and one for reverse link communications), and air interface channels are defined through spread spectrum modulation on those frequencies. In such a system, air interface communications in each coverage area are encoded with a pseudonoise (PN) offset to distinguish communications in the coverage area from those in adjacent coverage areas. Further, additional coding is used to define forward link channels including shared control channels such as a pilot channel, a sync channel, one or more paging channels, and a number of traffic channels assigned on an as needed basis, and reverse link channels including one or more shared access channels and a number of traffic channels assigned on an as needed basis. Other protocols may operate in a similar way or may define reverse access channels and reverse traffic channels in an altogether different way.

A reverse access channel may be divided into timeslots in which WCDs can transmit access probes, which may be data bursts carrying requests or other messages. In practice, the access channel may be shared by all WCDs in a coverage area, and a WCD may randomly select a timeslot in which to transmit an access probe. Statistically, this random selection will often result in successful transmission of the access probe to the RAN. When a WCD's access probe successfully arrives at the RAN, the RAN may then process the access probe and transmit a positive acknowledgement or other response on a forward paging channel to the WCD. At times, however, access probe transmission may fail, and the WCD may thus not receive an expected acknowledgement or other response from the RAN. When that happens, the WCD may then transmit the access probe again, possibly with increased transmission power, in an effort to ensure successful transmission of the access probe to the RAN. The air interface protocol may allow up to a certain number (e.g., three or six) of such access probe transmissions before the WCD concludes that its access attempt was a failure.

A WCD may engage in access attempts for various purposes. By way of example, from time to time, the WCD may register with the RAN in order to let the RAN know where the WCD is located and to allow the RAN to serve the WCD. To register, the WCD may transmit an access probe carrying data that defines and will be interpreted by the RAN as a registration request. If the access probe carrying a registration request arrives successfully at the RAN, the WCD may then receive a positive acknowledgement from the RAN. Otherwise, the WCD may repeat transmission of the registration request, again up to the allowed number of times before concluding that its access attempt failed.

As another example, the WCD may send an access probe in order to request assignment of a traffic channel through which to engage in bearer traffic communication. For instance, to place a voice call, the WCD may transmit an access probe carrying an origination request that specifies the called party's phone number and provides a service option code that informs the RAN that the request is for initiation of a voice call. If the RAN successfully receives the request, the serving MSC may then set up the call to the called party, and the serving BTS or BSC may send to the WCD a traffic channel assignment message designating an air interface traffic channel (e.g., both forward link and reverse link) to use for the call. On the other hand, if the WCD does not receive a response from the RAN, the WCD may again repeat the access probe transmission up to an allowed number of times before concluding that the access attempt failed.

Likewise, to send an SMS message on a traffic channel, the WCD may transmit in an access probe an origination request providing a service option code that informs the RAN that the access probe seeks assignment of a traffic channel for SMS message transmission, and the WCD may include in the access probe a "telephone number" of the SMSC so as to effectively set up a communication session between the WCD and the SMSC. If the RAN successfully receives this type of origination request, the RAN may then set up a session with the SMSC and may assign to the WCD a traffic channel over which the WCD can then transmit the SMS message. The WCD may then transmit the SMS message on the assigned traffic channel to the RAN, and the RAN may pass the transmission in turn to the SMSC for transmission of the message to its specified destination. On the other hand, again if the WCD does not receive a response from the RAN, the WCD may similarly repeat the access probe transmission up to an allowed number of times before concluding that the access attempt failed.

As yet another example, as noted above, the WCD can send an SMS message in an access probe, perhaps provided that the access probe is small enough according to applicable limitations. To do so, for instance, the WCD may include in the access probe an SMS message with fields including the recipient party's phone number or address and the text (or other data) of the SMS message. Further, the WCD may include in the access probe a service option code that informs the RAN that the access probe is an SMS message transmission, and the WCD may similarly include in the access probe a "telephone number" of the SMSC to trigger routing of the provided SMS message to the SMSC for transmission in turn to its destination. If the RAN successfully receives the SMS message from the WCD, the RAN may then pass the SMS message to the SMSC for transmission to its destination, and the RAN may send a positive acknowledgement to the WCD. Here again, if the WCD does not receive a response from the RAN, the RAN may repeat the access probe transmission up to an allowed number of times before concluding that the access attempt failed.

Other examples of access attempts, aside from registration requests, origination requests, and SMS message transmissions, may be possible as well, and any given access attempt may ultimately involve a number of access probe transmissions before succeeding. In accordance with the present method, a WCD may keep track of the number of access probes that it has taken for each of its access attempts to succeed, and the WCD may use that access probe count history as a basis to decide whether to send an SMS message on an access channel or on a traffic channel. Further, the WCD may compare its current location and the current time to the location and time of its access probe count history, as a basis to determine and weigh the relevance of its access probe count history.

Figure 2:
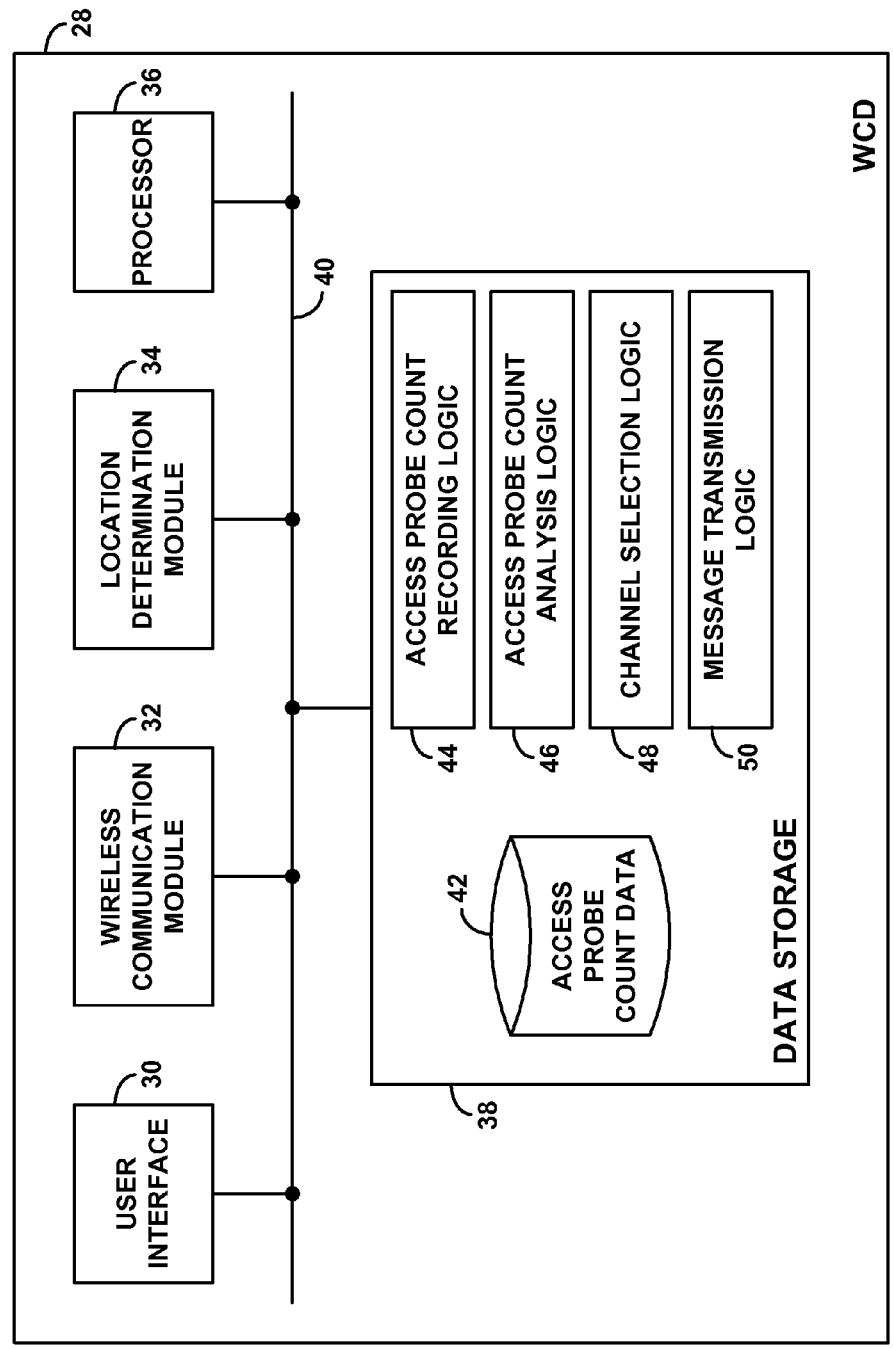
FIG. 2 is a simplified block diagram of an exemplary cellular wireless device.

FIG. 2 is next a simplified block diagram of WCD 28, showing functional components that can be included in such a device to facilitate implementation of the present method. As shown, the example WCD includes a user interface 30, a wireless communication module 32, a location-determination module 34, a processor 36, and data storage 38, all of which may be communicatively linked together by a system bus, network, or other connection mechanism 40. Although the blocks in FIG. 2 are shown separate from each other, it should be understood that functions of the various blocks can be integrated together in various ways, without deviating from the scope of this disclosure. For instance, the functions of the processor 36 and data storage 38 could be integrated together with those of the wireless communication interface 32, on an integrated chipset for instance, possibly together with the location-determination module 34. Further, the WCD or its components may include other features, such as a clock, that are not specifically shown. Other variations are possible as well.

User interface 30 includes input/output components to facilitate user interaction with the WCD. For instance, the user interface may include input components such as a keyboard, keypad, touch-sensitive screen, or voice-command feature, through which a user can enter an SMS message and designate a message recipient. (Entry or designation of an SMS message may take various forms, examples of which include user entry of the message text or the like, and user selection of a canned message or selection of an SMS message to forward. Likewise, entry or designation of a message recipient may take various forms, examples of which include user selection of a recipient from a contact list in the WCD, user entry of a recipient address, and user direction to reply to a sender.) Further, the user interface may include output components such as a display screen and a text-to-speech feature, for presenting entered and received SMS messages and address-designations to a user of the WCD.

Wireless communication module 32 comprises a wireless communication module and an associated antenna arrangement (including one or more antennas), for engaging in air interface communication with RAN 12 according to an agreed air interface protocol such as one of the protocols noted above for instance. By way of example, wireless communication module 32 may comprise a Mobile Station Modem (MSM) chipset of the type manufactured by Qualcomm Incorporated, arranged or modified to have logic to arranged to implement various features described herein.

Location-determination module 34 may comprise a global positioning system (GPS) receiver or other module that facilitates determination of the location of WCD 28. As in a dedicated navigation system, the location-determination module 34 may use signaling received from GPS satellites to facilitate location determination. Further, to the extent the location-determination module can communicate, perhaps via wireless communication interface 32, with RAN 12, the module could interact with location-determination system 26 to facilitate location determination. Location-determination module 34 may also include an accelerometer, a compass, and/or other features, to facilitate location tracking through dead-reckoning when appropriate.

Processor 36 may comprise one or more general purpose processors (e.g., INTEL microprocessors) and/or one or more special purpose processors (e.g., application specific integrated circuits, digital signal processors, etc.). Data storage 38, in turn, may comprise one or more volatile and/or non-volatile storage components, such as optical, magnetic, flash, or organic storage, and may be integrated in whole or in part with processor 34.

Data storage 38 may in turn contain reference data and program logic executable by processor 36 to carry out various functions described herein. By way of example and without limitation, data storage 38 is shown storing or otherwise defining access probe count data 42, access probe count recording logic 44, access probe count analysis logic 46, channel selection logic 48, and message transmission logic 50.

Access probe count data 42 comprises data that indicates how many access probes the WCD sent for each of a plurality of earlier access attempts (not for the SMS message currently at issue), and access probe count recording logic 44 comprises instructions executable by processor 36 to record or otherwise establish the access probe count data 42. As such, the access probe count data may take various forms. By way of example, the data may comprise a list of access probe counts recorded by the WCD for each of various earlier access attempts, and/or the data may comprise a rolling average of access probe counts for a number of earlier access attempts.

The number of access probes that a WCD sent for a particular access attempt could be a count of the number of access probes it took for the WCD to ultimately succeed in the access attempt. Alternatively, if the WCD's access attempt failed, the count could be the total number of access probes that the WCD sent until concluding that the attempt failed.

In practice, WCD 28 executes access probe count recording logic 44 to record access probe counts as the WCD engages in or completes access attempts. The WCD may keep a raw listing of the access probe counts and/or maintain rolled up data representative of the access probe counts. Further, the access probe count recording logic 44 may be arranged to record access probe counts for all of the WCD's access attempts or for just some proper subset of the WCD's access attempts (such as just particular types of access attempts (e.g., registration requests, origination requests, etc.), or just access attempts at particular times or locations).

For improved performance, the access probe count recording logic 44 may be executable to record not only the access probe count for each of the WCD's access attempts but also the WCD's geographic location and a current time at the time of each access probe count (e.g., during or upon conclusion of the access attempt). The WCD can then use the recorded location and time as a basis to determine the relevance of access probe count data when using the data as a basis to decide whether to send an SMS message on a reverse access channel or on a reverse traffic channel.

To facilitate recording of the WCD's location at the time of an access attempt, the access probe count recording logic 44 may invoke location-determination module 34 to obtain geographic coordinates (e.g., latitude/longitude coordinates) of the WCD. As noted above, the location could be determined by the location-determination module 34 using techniques like those used by standalone GPS-based navigation units (perhaps with added dead-reckoning if out of GPS coverage) and/or through interaction with location-determination system 26. Any known or later developed mechanism for determining location can be used for this purpose.

Access probe count analysis logic 46 next comprises instructions executable by processor 36 to evaluate and perhaps establish a representative measure of access probe count history of the WCD, for use as a basis for the WCD to decide whether to send an SMS message on a reverse access channel or on a reverse traffic channel. As such, access probe count analysis logic 44 may operate in various ways and at various times.

In an example implementation, processor 36 may execute access probe count analysis logic 46 periodically or in response to the WCD having an SMS message to send. In operation, the analysis logic 46 may function to establish a rolling average of access probe count over time for various access attempts by the WCD. In doing so, the analysis logic may compare the current time with the times of various recorded access probe counts of the WCD and may weigh more recent access probe counts more heavily than older access probe counts. Further, the analysis logic may compare the WCD's current location (again indicated by location-determination module 34 for instance) with the locations of various recorded access probe counts of the WCD and may weight more heavily those access probe counts that were for access attempts where the WCD was closer to the WCD's current location. Still further, the analysis logic may altogether eliminate from the evaluation any access probe counts whose time is more than a defined threshold from the current time or whose location is more than a defined threshold from the WCD's current location. In this manner, the WCD may avoid consideration of impertinent data, by focusing its analysis on access probe count history related to the WCD's current location (within some defined radius of relevance) and perhaps further or alternatively by focusing its analysis on access probe count history for access attempts made very recently or at an analogous time of day.

The WCD may further or alternatively consider as a relevant access probe count history any data that indicates access probe count history for one or more devices other than the WCD. For instance, through a short-range communication interface (e.g., a BLUETOOTH, WIFI, or other such interface (not shown)), the WCD may obtain access probe count history data or a measure of access probe count history from one or more nearby WCDs, indicating access probe count history for the one or more nearby WCDs. (The one or more other WCDs would correspondingly be programmed with logic to record and report such data, to facilitate this.) The access probe count analysis logic 46 may then base its analysis on the access probe count history of the one or more other devices (again, perhaps filtering or weighing the data based on time and location, and/or based on other parameters (such as device type) that may help establish the relevance of the data provided by the one or more other devices) together with or instead of the access probe history of the WCD at issue.

In practice, the access probe count analysis logic 46 may establish and store in data storage 38 a measure representative of the access probe count history that it evaluated, as a basis for the WCD to decide whether to send its SMS message on a reverse access channel or on a reverse traffic channel. The measure may be a representative access probe count (e.g., average value over numerous access probe counts). Alternatively, the measure may be some other indicator, such as a Boolean value that indicates whether relevant access probe counts have generally been higher than a particular threshold or lower than a particular threshold. Other examples are possible as well.

Channel selection logic 48, in turn, is executable by processor 36 to decide whether the WCD should send an SMS message on a reverse access channel or on a reverse traffic channel. In practice, channel selection logic 48 may make this decision based on the measure of access probe count history established by access probe analysis logic 46. For instance, if the measure of access probe count history at least as high as a defined threshold, then channel selection logic 48 may decide that the WCD should send the message on a reverse traffic channel; whereas, if the measure of access probe count history is lower than the defined threshold, then channel selection logic 46 may decide that the WCD should send the message on a reverse access channel.

Message transmission logic 50 is then executable by processor 36 to transmit or cause transmission of a message via the wireless communication module 32 on the channel (i.e., type of channel) selected by channel selection logic 48. For instance, if the channel selection logic 48 decides that the WCD should transmit the message on a reverse access channel, then the message transmission logic 50 may direct wireless communication module 32 to send the message as a data burst on a reverse access channel (e.g., to select one of a number of available reverse access channels and to transmit the message in an access probe on that channel, or to simply transmit the message in an access probe on a single available access channel). On the other hand, if the channel selection logic 48 decides that the WCD should transmit the message on a reverse traffic channel, then the message transmission logic 50 may direct wireless communication module 32 to engage in a signaling process such as described above (e.g., via a reverse access channel) so as to request reverse traffic channel assignment and to thereby acquire a reverse traffic channel, and to then transmit the message on the acquired reverse traffic channel.

Figure 3:
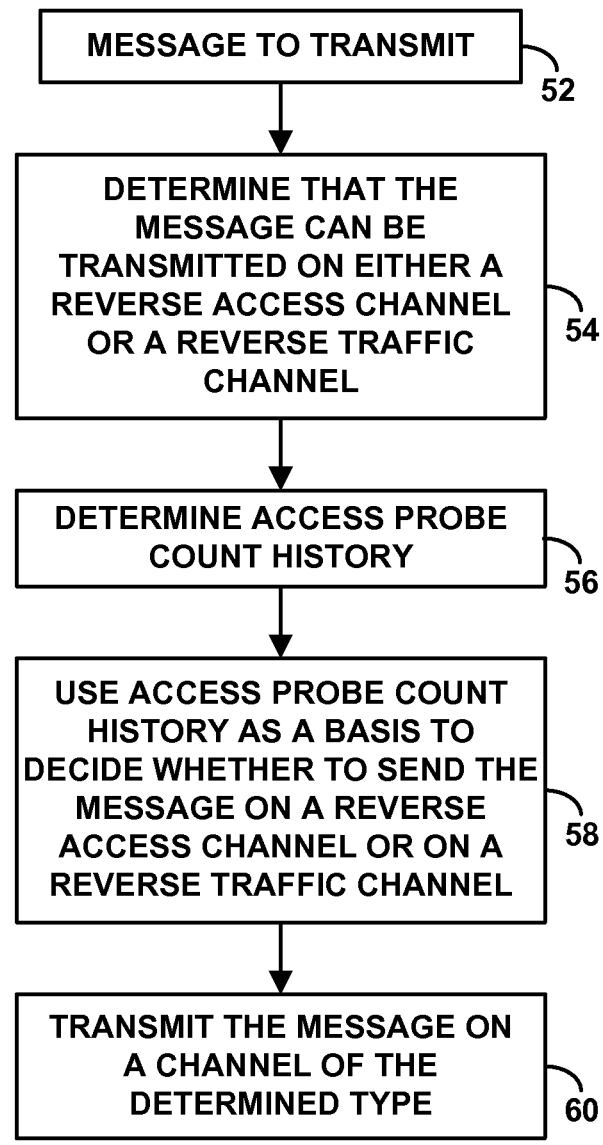
FIG. 3 is a flow chart depicting functions that can be implemented in accordance with the exemplary method.

FIG. 3 is next a flow chart depicting functions that can be implemented in accordance with the exemplary method. As shown in FIG. 3 at block 52, the method may begin when the WCD has a message (e.g., SMS message or other type of message) to transmit. At block 54, the method may then involve the WCD determining that the message is of a type (e.g., size) that can be transmitted on either a reverse access channel or a reverse traffic channel. At block 56, the method may then involve the WCD determining a measure of access probe count history (e.g., by reading the measure from data storage or by establishing the measure). At block 58, the method may involve the WCD using the determined measure as a basis to decide whether to send the message on a reverse access channel or on a reverse traffic channel. And at block 60, the method may then involve the WCD transmitting the message on a channel of the type selected at step 56.

An exemplary embodiment of the present method has been described above. Those of ordinary skill in the art will appreciate that variations from the embodiment described are possible, and that numerous changes may therefore be made while remaining within the true scope and spirit of the invention as described by the claims.

We claim:

1. In a wireless communication device (WCD), a method for managing transmission of a message from the WCD, the method comprising:
the WCD determining a measure of how many access probes per access attempt the WCD has tended to transmit for previous access attempts that were not for transmission of the message; and
the WCD deciding based on the determined measure whether to transmit the message on a reverse access channel or on a reverse traffic channel, and the WCD transmitting the message accordingly.

2. The method of claim 1, wherein a plurality of reverse access channels exist in a wireless coverage area in which the WCD is going to transmit the message, and wherein if the WCD decides to transmit the message on a reverse access channel, the WCD transmitting the message accordingly comprises:
the WCD selecting one of the plurality of reverse access channels and transmitting the message on the selected reverse access channel.

3. The method of claim 1, wherein a single reverse access channel exists in a wireless coverage area in which the WCD is going to transmit the message, and if the WCD decides to transmit the message on a reverse access channel, the WCD transmitting the message accordingly comprises:
the WCD transmitting the message on the single reverse access channel.

4. The method of claim 1, wherein a plurality of reverse traffic channels exist in a wireless coverage area in which the WCD is going to transmit the message, and wherein if the WCD decides to transmit the message on a reverse traffic channel, the WCD transmitting the message accordingly comprises:
the WCD engaging in a signaling process to acquire at least one of the reverse traffic channels, and the WCD then transmitting the message on the acquired reverse traffic channel.

5. The method of claim 4, wherein engaging in the signaling process comprises engaging in reverse access channel signaling in order to request reverse traffic channel assignment.

6. The method of claim 1, wherein determining the measure of how many access probes per access attempt the WCD has tended to transmit for previous access attempts comprises:
for each of a plurality of previous access attempts by the WCD, recording in data storage of the WCD a respective count of access probes that the WCD transmitted for the access attempt; and
statistically evaluating the recorded respective counts to determine the measure.

7. The method of claim 6, wherein statistically evaluating the recorded respective counts comprises averaging the recorded respective counts.

8. The method of claim 1, wherein transmitting the message accordingly comprises transmitting the message from the WCD to a radio access network (RAN) base station.

9. The method of claim 1, wherein the message is a Short Messaging Service (SMS) message.

10. The method of claim 1, further comprising:
the WCD determining that the message is shorter than a threshold length; and
responsive to the determining, the WCD carrying out the deciding.

11. The method of claim 1, wherein determining the measure comprises using at least one factor selected from the group consisting of access attempt location and access attempt time as a basis to filter the determining.

12. A wireless communication device (WCD) comprising:
a user interface through which a user of the WCD can enter into the WCD a message for transmission by the WCD;
a wireless communication module for transmitting the message over an air interface to a radio access network (RAN) base station;

access probe analysis logic arranged to determine a measure of how many access probes per access attempt the WCD has tended to transmit for access attempts that were not for transmission of the message; and channel selection logic arranged to decide based on the determined measure whether the WCD should transmit the message on a reverse access channel of the air interface or on a reverse traffic channel of the air interface.

13. The WCD of claim 12, wherein the access probe analysis logic and channel selection logic are part of the wireless communication module.

14. The WCD of claim 12, wherein the access probe analysis logic and channel selection logic are implemented by a processor executing instructions.

15. The WCD of claim 12, wherein if the channel selection logic decides that the WCD should transmit the message on a reverse access channel, the wireless communication module accordingly transmits the message as a data burst on a reverse access channel.

16. The WCD of claim 12, wherein if the channel selection logic decides that the WCD should transmit the message on a reverse traffic channel, the wireless communication module engages in a signaling process to acquire a reverse traffic channel, and the wireless communication module then transmits the message accordingly on the acquired reverse traffic channel.

17. The WCD of claim 16, wherein the signaling process includes engaging in reverse access channel signaling in order to request reverse traffic channel assignment.

18. The WCD of claim 12, wherein the access probe analysis logic determines the measure by reading the measure from data storage of the WCD.

19. The WCD of claim 12, wherein the access probe analysis logic records in data storage of the WCD, for each of a plurality of previous access attempts by the WCD, a respective count of access probes that the WCD transmitted for the access attempt, and wherein the access probe analysis logic determines the measure by statistically evaluating the respective counts.

20. The WCD of claim 12 wherein the access probe analysis logic uses at least one factor selected from the group consisting of access attempt location and access attempt time as a basis to focus determination of the measure.

21. The WCD of claim 12, wherein the message is a Short Messaging Service (SMS) message.

22. A wireless communication device (WCD) comprising:
a user interface through which a user of the WCD can enter into the WCD a message for transmission by the WCD;
a wireless communication module for transmitting the message over an air interface to a radio access network (RAN) base station; and
logic arranged to determine a measure of access probe count history for access attempts that were not for transmission of the message, and to decide based on the determined measure whether the WCD should transmit the message on a reverse access channel of the air interface or on a reverse traffic channel of the air interface.

* * * * *